(12) United States Patent
Arishima et al.

(10) Patent No.: US 8,764,313 B2
(45) Date of Patent: Jul. 1, 2014

(54) OPTICAL CONNECTOR PLUG

(75) Inventors: Koichi Arishima, Yokohama (JP); Yoshi Kurosawa, Yokohama (JP); Fumiaki Hanawa, Yokohama (JP); Ryo Nagase, Atsugi (JP); Toshiaki Eguchi, Tokyo (JP); Naohide Goto, Tokyo (JP)

(73) Assignees: NTT Electronics Corporation, Yokohama-Shi, Kanagawa (JP); Nippon Telegraph and Telephone Corporation, Tokyo (JP); Honda Tsushin Kogyo Co. Ltd, Tokyo (JP)

( * ) Notice: Subject to any disclaimer, the term of this patent is extended or adjusted under 35 U.S.C. 154(b) by 191 days.

(21) Appl. No.: 13/509,934

(22) PCT Filed: Nov. 17, 2010

(86) PCT No.: PCT/JP2010/006727
§ 371 (c)(1),
(2), (4) Date: May 15, 2012

(87) PCT Pub. No.: WO2011/061926
PCT Pub. Date: May 26, 2011

(65) Prior Publication Data
US 2012/0219253 A1    Aug. 30, 2012

(30) Foreign Application Priority Data
Nov. 17, 2009 (JP) .................. 2009-261822

(51) Int. Cl.
*G02B 6/36* (2006.01)
*G02B 6/38* (2006.01)

(52) U.S. Cl.
CPC ............ *G02B 6/3893* (2013.01); *G02B 6/3825* (2013.01); *G02B 6/3849* (2013.01)
USPC ................................ 385/78; 385/76; 385/77

(58) Field of Classification Search
CPC .. G02B 6/3987; G02B 6/3893; G02B 6/3825; G02B 6/3849
USPC ........................................ 385/76–88
See application file for complete search history.

(56) References Cited

U.S. PATENT DOCUMENTS 3,806,225 A * 4/1974 Codrino ................ 385/88
4,415,232 A   11/1983 Caron
(Continued)

FOREIGN PATENT DOCUMENTS

CN    1767270       5/2006
JP    57-161820     10/1982
(Continued)

OTHER PUBLICATIONS

International Search Report issued Jan. 11, 2011 for PCT/JP2010/006727, filed Nov. 17, 2010.
(Continued)

*Primary Examiner* — Rhonda Peace
(74) *Attorney, Agent, or Firm* — Workman Nydegger

(57) ABSTRACT

An optical connector plug to be inserted to an adapter, is arranged such that a pair of engaging parts for expanding an elastic locking piece provided on a side of the adapter by a taper part and locking it with a step part is provided on a tip part of a plug frame which is a body of the plug; a locking releasing piece movable along an insertion-extraction direction is provided between the pair of engaging parts; a taper part for releasing a locking action of the elastic locking piece when extracting the plug is provided at a rear end of the locking releasing piece; and the taper part of the engaging parts has such a shape that the connecting stress is not lowered before being locked when inserting the plug.

17 Claims, 8 Drawing Sheets

(56) References Cited

U.S. PATENT DOCUMENTS

| | | | |
|---|---|---|---|
| 4,726,647 A * | 2/1988 | Kakii et al. | 385/60 |
| 4,875,754 A * | 10/1989 | Rao et al. | 385/84 |
| 4,998,796 A * | 3/1991 | Bonanni et al. | 385/83 |
| 5,136,672 A * | 8/1992 | Mulholland et al. | 385/53 |
| 5,465,313 A * | 11/1995 | Belenkiy et al. | 385/80 |
| 5,542,015 A * | 7/1996 | Hultermans | 385/60 |
| 5,764,834 A * | 6/1998 | Hultermans | 385/60 |
| 5,993,071 A * | 11/1999 | Hultermans | 385/70 |
| 6,022,151 A | 2/2000 | Meyer-Guldner et al. | 385/92 |
| 6,290,527 B1 * | 9/2001 | Takaya et al. | 439/352 |
| 6,435,728 B2 | 8/2002 | Shimoji et al. | 385/56 |
| 6,585,423 B1 * | 7/2003 | Vergeest | 385/60 |
| 6,599,027 B2 * | 7/2003 | Miyake et al. | 385/78 |
| 6,718,091 B2 | 4/2004 | Ishihara et al. | 385/36 |
| 6,776,535 B2 * | 8/2004 | Miyake et al. | 385/78 |
| 6,783,281 B2 * | 8/2004 | Cheng | 385/55 |
| 6,913,394 B2 * | 7/2005 | Iwano et al. | 385/78 |
| 7,090,409 B2 * | 8/2006 | Nakajima et al. | 385/77 |
| 7,093,983 B2 * | 8/2006 | Taira et al. | 385/78 |
| 7,287,912 B2 * | 10/2007 | Koreeda et al. | 385/75 |
| 7,559,700 B2 * | 7/2009 | Eguchi et al. | 385/70 |
| 7,654,849 B2 * | 2/2010 | Gordon et al. | 439/350 |
| 8,224,144 B2 * | 7/2012 | Allen | 385/135 |
| 2001/0019647 A1 * | 9/2001 | Okochi et al. | 385/78 |
| 2002/0122634 A1 * | 9/2002 | Miyake et al. | 385/78 |
| 2002/0159716 A1 * | 10/2002 | Ohbayashi et al. | 385/78 |
| 2002/0159717 A1 * | 10/2002 | Miyake et al. | 385/78 |
| 2003/0049000 A1 * | 3/2003 | Wu | 385/92 |
| 2004/0017982 A1 * | 1/2004 | Nakajima et al. | 385/78 |
| 2004/0033028 A1 * | 2/2004 | Cheng | 385/55 |
| 2004/0072454 A1 * | 4/2004 | Nakajima et al. | 439/79 |
| 2005/0226568 A1 * | 10/2005 | Nakajima et al. | 385/60 |
| 2005/0232550 A1 * | 10/2005 | Nakajima et al. | 385/60 |
| 2006/0094284 A1 | 5/2006 | Aizawa et al. | |
| 2008/0095504 A1 * | 4/2008 | Kawasaki | 385/84 |
| 2008/0247709 A1 | 10/2008 | Eguchi et al. | |
| 2009/0310919 A1 * | 12/2009 | Arai et al. | 385/87 |
| 2012/0219253 A1 * | 8/2012 | Arishima et al. | 385/76 |

FOREIGN PATENT DOCUMENTS

| | | |
|---|---|---|
| JP | 61-196482 | 12/1986 |
| JP | 62-078507 | 4/1987 |
| JP | 2005-017602 | 1/2005 |
| JP | 2006-127943 | 5/2006 |
| JP | 2006-147283 | 6/2006 |
| JP | 2007-503095 | 2/2007 |
| JP | 2008-176297 | 7/2008 |
| WO | WO 2005/020374 | 3/2005 |

OTHER PUBLICATIONS

Office Action dated Dec. 4, 2013 in corresponding Chinese Patent Application No. 201080052244.4.

* cited by examiner

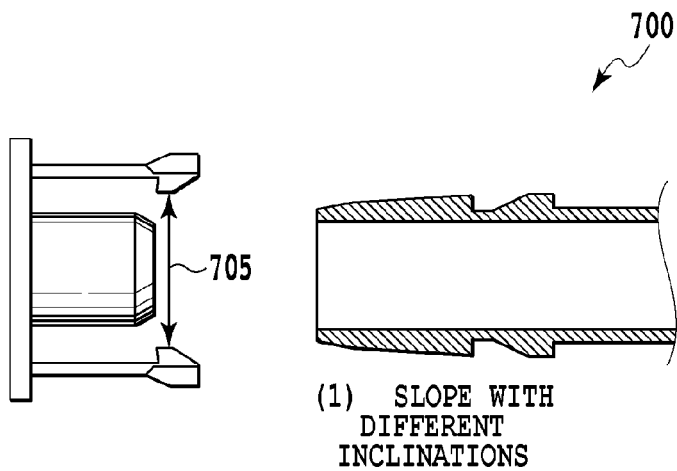
(1) SLOPE WITH DIFFERENT INCLINATIONS
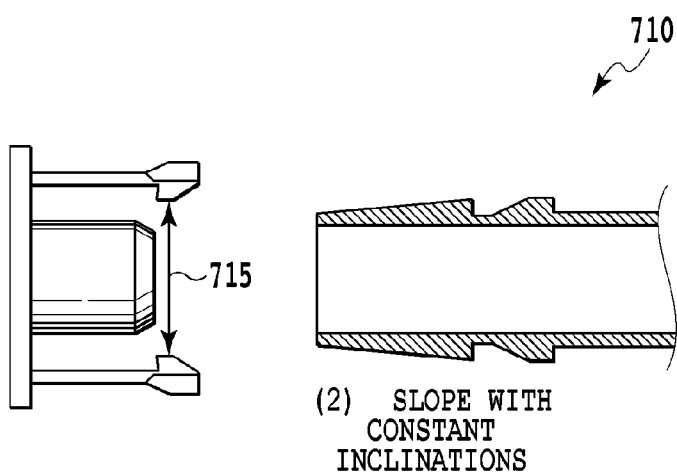
(2) SLOPE WITH CONSTANT INCLINATIONS

OPTICAL CONNECTOR PLUG

TECHNICAL FIELD

The present invention relates to an optical connector plug to be inserted into and extracted from a connector adapter, particularly relates to an optical connector plug which is easily inserted into and extracted from the connector adapter, and which is compatible with a SC type connector in the connector for optical fiber cord connection.

BACKGROUND ART

In recent years, along with the development of FTTH, the opportunity for ordinary people other than a special construction dealer to touch an optical connector is increasing. In connector operations, when inserting and extracting the conventional SC type connector plug into and from a connector adapter, the connector plug remains in the connector adapter in the half-way in insertion or extraction, and it is known that a so-called half-way insertion occurs. In order to avoid this state, conventionally a marking was put on a part of the connector plug, and the connector plug was inserted or extracted so that the marking is invisible.

CITATION LIST

Patent Literature

PTL 1: Japanese Patent Laid-Open No. s62-78507 (1987)
PTL 2: Japanese Patent Publication No. 4215577
PTL 3: Japanese Patent Laid-Open No. 2008-176297

SUMMARY OF INVENTION

Technical Problem

The problem in the insertion and extraction of the conventional SC type connector plug into and from the connector adapter is described in further details with reference to the patent literature 1.

FIG. 1A to FIG. 1E are diagrams showing a connecting mechanism 100 in the conventional SC type connector.

In FIG. 1A, when a conventional SC type connector plug 110 is inserted into a connector adapter 120, an adapter elastic locking piece 121 moves a flat part 112 at a tip part of a plug housing after moving along a slope 111 while being extended along the slope at the tip of the plug housing (FIG. 1B). Then, when the elastic locking piece 121 goes down along a slope 113 at a rear part of the plug housing, the tip of the elastic locking piece 121 falls in front of a suspending part 114 of a plug frame (FIG. 1C). If the plug 110 is furthermore pushed in, the plug 110 moves while the elastic locking piece 121 touches the suspending part 114 of the plug frame (FIG. 1D), and the elastic locking piece 121 is eventually fallen and locked by a step part 115 of the plug frame, and the engagement is attained (FIG. 1E).

When such operation is performed, changes in stress 200 measuring the force of inserting the plug 110 into the adapter 120 are shown in FIG. 2.

As for a stress when inserting the conventional SC type connector plug 110 into the adapter 120, first, the adapter elastic locking piece 121 contacts a tip part of a plug housing, and by moving along the slope 111, the elastic locking piece 121 is extended. Thus, the stress increases abruptly (symbol b). Thereafter, while the elastic locking piece 121 moves along the flat part 112 of the plug housing, and the slope 113, changes in stress are seen in FIG. 2, and the stress becomes almost zero when the elastic locking piece 121 falls in front of the suspending part 114 of the plug frame (symbol c). When being further inserted, the elastic locking piece 121 moves the suspending part 114 of the plug 110 on the other side (symbol d). Further, the stress increases as a ferrule of the plug starts contacting a partner ferrule on the other side, and the stress becomes almost zero when the elastic locking piece 121 falls in the step part 115 of the plug, and is stopped, whereby the plug is in the completely connected state (symbol e). By further inserting, a repulsive force from the ferrule on the other side is added, and the stress increases again.

As can be seen in FIG. 2, since the state (symbol c) where the stress becomes almost zero exists in the middle of the connecting process, a worker mistakes the state for the state (symbol e) where the stress becomes zero when connected. In this case, a worker stops the connecting operation on the way, and the state in which the connector plug 110 has not been inserted into adapter 120 completely (half-way insertion) occurs.

In order to avoid the foregoing state of the half-way insertion, the several measures have been taken. For example, the procedures to insert until it stops moving, or until hearing the clicking sound are described in the procedure manual. Moreover, a white line is printed on a connector housing in order to determine that the connector plug is completely connected.

The above measures may be effective. However, under bad installation conditions of the adapter 120, it may be hard to hear the sound when connected, or the white line is hard to recognize if the connector housing cannot be seen directly. Therefore, in fact it is difficult to completely prevent the half-way insertion. Furthermore, as the FTTH becomes popular, the cases where unskilled workers or ordinary people deal with the optical connector are increasing, and the measure for preventing this state of half-way insertion is more necessitated.

Also when extracting the plug from the adapter, the plug is stopped on the way in the state where the stress becomes zero (symbol c). This state is also the state of half-way insertion when extracting, which is another problem. If this state of the half-way insertion occurs, although the plug 110 is apparently inserted into the adapter 120, light is not conducted. Therefore, this may cause a delay in defining a factor of a failure.

The present invention has been made in view of the above circumstances and provides an optical connector plug which can prevent an occurrence of such phenomena that a connecting stress is reduced to zero or lowered on the way in a process of inserting or extracting, or preventing an occurrence of a half-way insertion on the way of inserting or extracting process, when a general person other than a professional construction worker inserts or extracts the optical connector.

Solution to Problem

In order to solve the above problem, the optical connector plug of the present invention is the optical connector plug to be inserted into an adapter, wherein a pair of engaging parts for expanding an elastic locking piece provided on a side of the adapter by a taper part and locking it with a step part is provided on a tip part of a plug frame which is a body of the plug; a locking releasing piece movable along an insertion-extraction direction is provided between the pair of engaging parts; a taper part for releasing a locking action of the elastic locking piece when extracting the plug is provided at a rear end of the locking releasing piece; and the taper part of the engaging parts has such a shape that the connecting stress is not lowered before being locked when inserting the plug.

The optical connector plug includes a flat face between the taper part and the step part of the engaging part.

The taper part of the engaging part has a multistage tapered shape.

The optical connector housing is provided with a light-shielding member.

Advantageous Effects of Invention

According to the optical connector plug of the present invention, when connecting to the adapter, an adapter elastic locking piece is directly extended by the plug frame, to move the plug frame, and the adapter locking piece falls in a suspending part, thereby completing the connecting. With this mechanism, both the frame front part and frame center part of the plug form slopes, more preferably form slopes with constant inclination, whereby the stress increases gradually until the adapter locking piece falls in the suspending part of the plug frame, and it is possible to hold a change amount in stress to the same as possible.

As a result, the stress does not decrease in the middle when connecting the plug. Thus, the worker who connects the connector plug does not misunderstand that the plug is inserted in the suspending part and connected completely, thereby preventing the half-way insertion.

Further, as the 7th clause of JIS C5973, structure, form, and size is defined in FIG. 1A through FIG. 1E, conventional SC type connector has a slope angle of a front part of the plug frame of 25° to 35°. Here, the smaller is this slope angle, the smaller is the stress when connecting the plug frame to the adapter. In the optical connector plug of the present invention, however, since the taper part for extraction at a rear part of the plug housing of the conventional SC type connector is not needed, there is an advantage that the slope angle can be made smaller.

BRIEF DESCRIPTION OF DRAWINGS

FIG. 7A is a drawing showing a variation of a slope form of a plug frame of the optical connector plug according to the first embodiment of the present invention;

FIG. 7B is a drawing showing a variation of a slope form of a plug frame of the optical connector plug according to the first embodiment of the present invention.

DESCRIPTION OF EMBODIMENTS

Figure 1A:
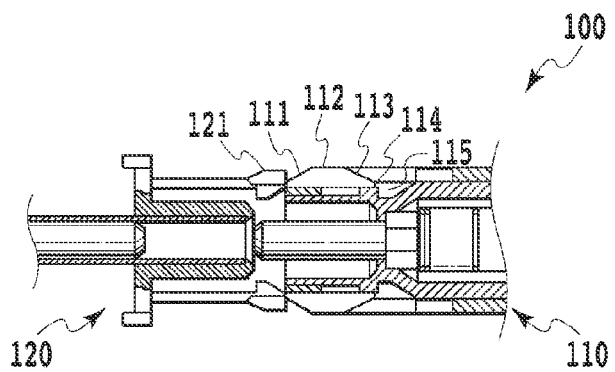
FIG. 1A is a drawing explaining a connecting mechanism of a SC type connector using conventional technology.
Figure 1B:
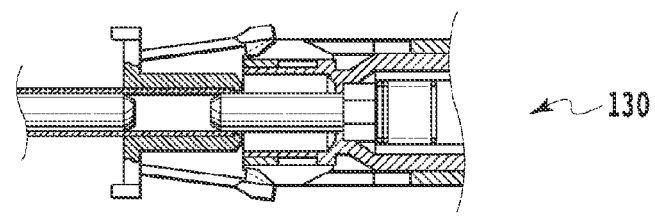
FIG. 1B is a drawing explaining the connecting mechanism of the SC type connector using conventional technology.
Figure 1C:
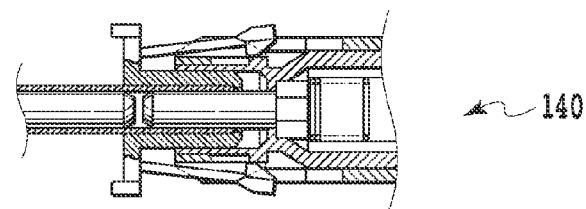
FIG. 1C is a drawing explaining the connecting mechanism of the SC type connector using conventional technology.
Figure 1D:
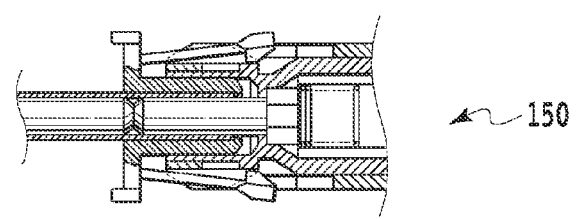
FIG. 1D is a drawing explaining the connecting mechanism of the SC type connector using conventional technology.
Figure 1E:
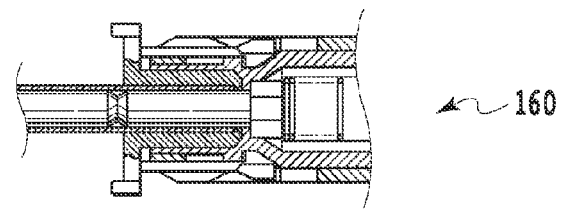
FIG. 1E is a drawing explaining the connecting mechanism of the SC type connector using conventional technology.
Figure 2:
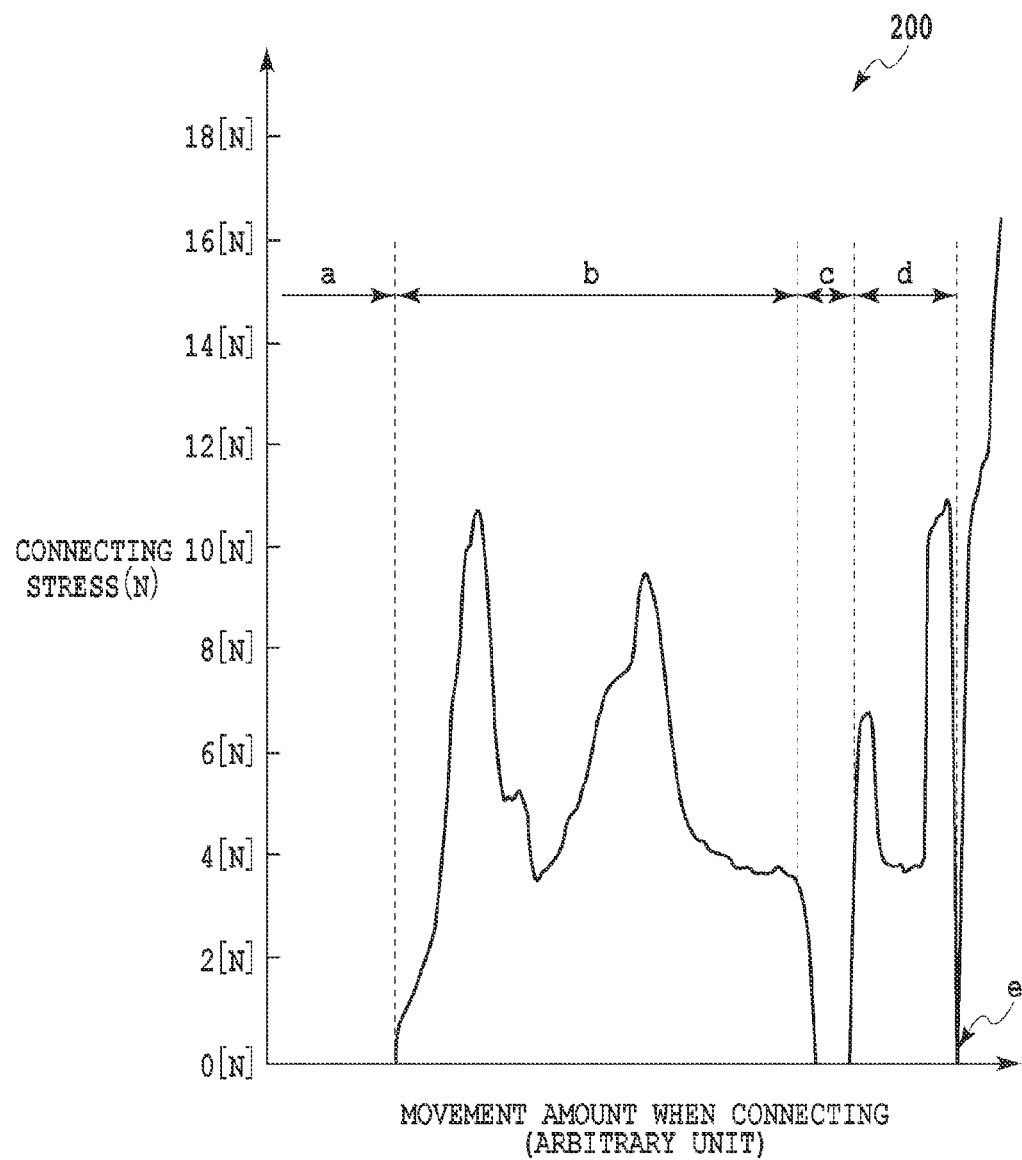
FIG. 2 is a drawing showing changes in stress when connecting the SC type connector using conventional technology.

An optical connector plug of the present invention is explained in detail with reference to the drawings.

First, an embodiment in an examination process of the present invention is described based on the connector plug shown in the patent literature 2. The patent literature 2 discloses a connector plug of SC type conformity. The adapter disclosed in the patent literature 2 is the same as that of the SC type connector adapter shown in FIG. 1A to FIG. 1E, and only the form of a connector plug differs. In the examination process of the present invention, a configuration wherein a tip slope is added to the connector plug disclosed in the patent literature 2 is considered.

FIG. 3A to FIG. 3D are drawings explaining a connecting mechanism 300 of a connector according to an embodiment in the examination process of the present invention.

The comparison with the conventional technology is described in detail. That is, in the conventional SC type connector 110 shown in FIG. 1A to FIG. 1E, when connecting, after extending and moving the elastic locking piece 121 of the adapter 120 along the slope 111 at a front part of the plug housing, the locking piece 121 falls in the step part 115 of the connector plug 110, whereas when releasing the connecting, the elastic locking piece 121 is opened by the slope 113 at the rear part of the plug housing to come off from the step part 115.

Figure 3A:
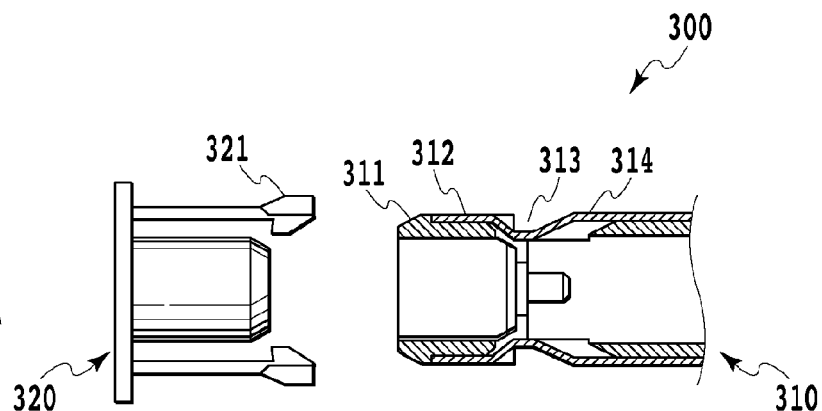
FIG. 3A is a drawing explaining a connecting mechanism of an optical connector plug according to an embodiment in the examination process of the invention of the present invention.
Figure 3B:
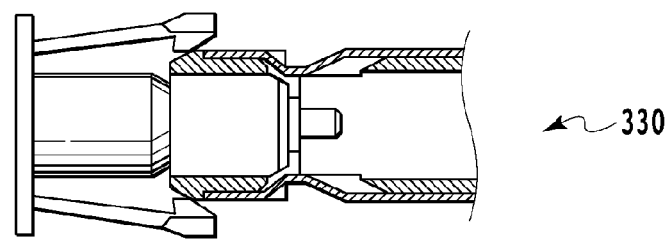
FIG. 3B is a drawing explaining the connecting mechanism of the optical connector plug according to the embodiment in the examination process of the invention of the present invention.
Figure 3C:
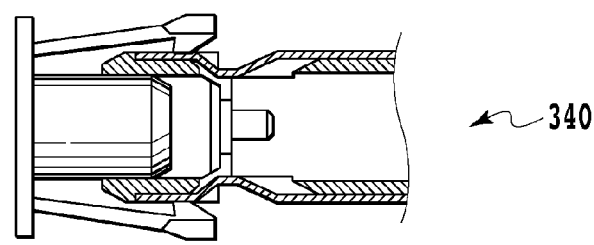
FIG. 3C is a drawing explaining the connecting mechanism of the optical connector plug according to the embodiment in the examination process of the invention of the present invention.
Figure 3D:
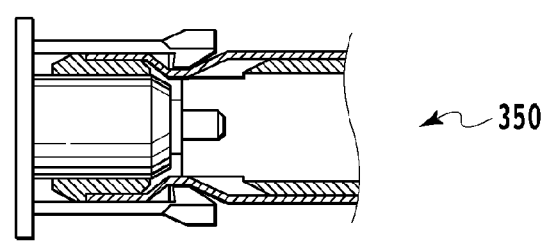
FIG. 3D is a drawing explaining the connecting mechanism of the optical connector plug according to the embodiment in the examination process of the invention of the present invention.

On the other hand, according to the connector shown in FIG. 3A to FIG. 3D, an elastic locking piece 321 of an adapter 320 is opened directly by a front part 311 of the plug frame (FIG. 3B), and after moving along a flat part 312 of the plug frame (FIG. 3C), the locking piece 321 falls in a step part 313 of the plug frame (FIG. 3D). When releasing the connecting, the elastic locking piece 321 is opened by a pulling plate 314 located between a plug frame 310 and the elastic locking piece 321, to come off from the step part 313.

Figure 4:
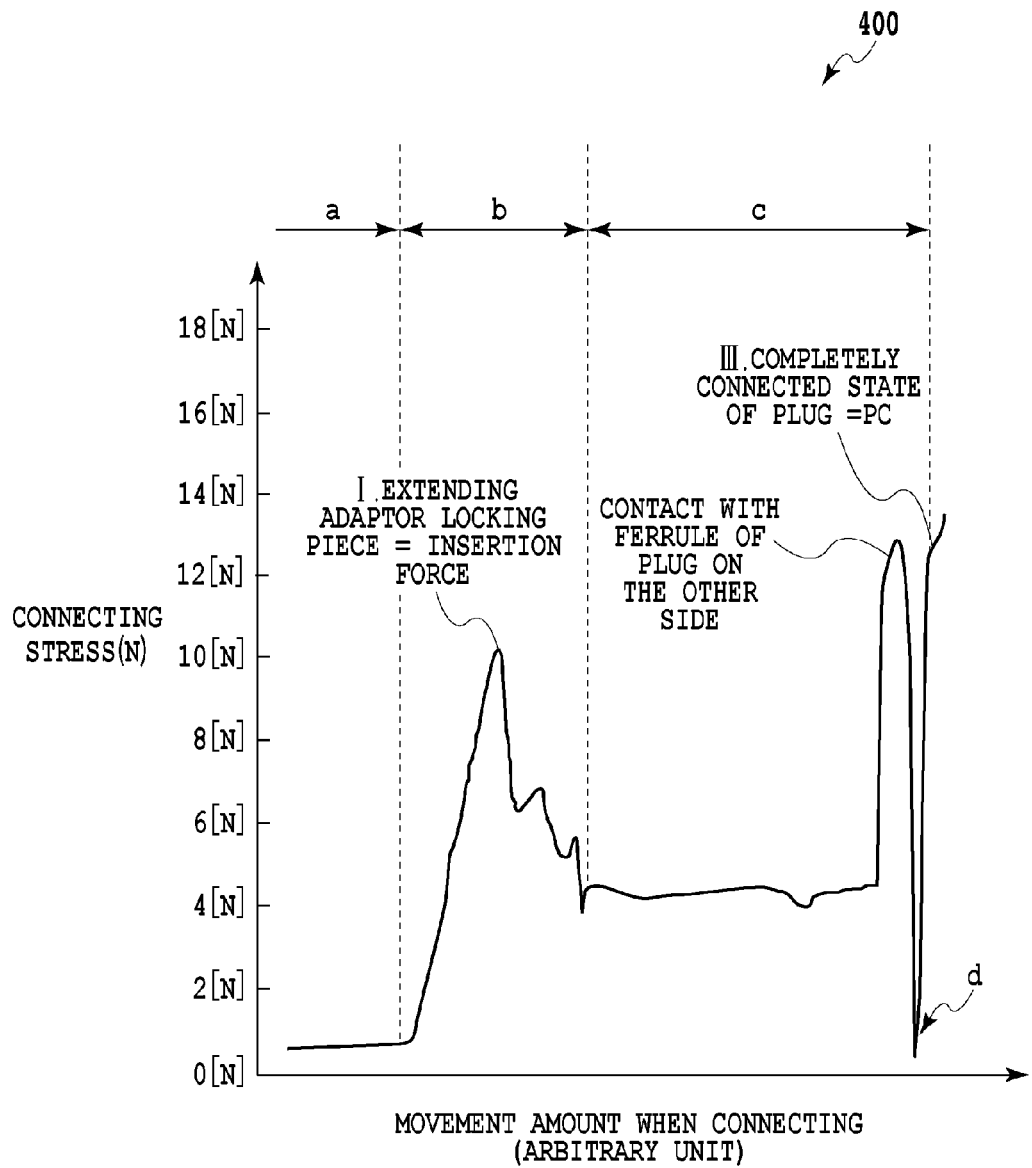
FIG. 4 is a drawing showing changes in stress when connecting the optical connector plug according to the embodiment in the examination process of the invention of the present invention this application.

FIG. 4 is a drawing showing changes in stress 400 when the connector plug 310 is inserted into the adapter 320. According to the SC type connector of the conventional technology, the elastic locking piece 121 falls by the slope 113 at the rear part of the plug housing, which surrounds the plug frame 110. According to the connector plug 310 shown in FIG. 3A through FIG. 3D, since the elastic locking piece 321 does not fall on the way, it is not seen that the stress becomes zero. As a result, the state of the half-way insertion is less likely to occur as compared to the SC type connector of the conventional technology.

However, such phenomenon that the connecting stress is reduced from the start in the half way is seen also in the mechanism in which this plug frame extends the elastic locking piece 321 of the adapter directly, although the stress in the half-way does not become zero. In this case, a worker may feel like there becomes no stress when working.

Moreover, when extracting the connector plug 310 from the connector adapter 320, since stress is not changed halfway, it becomes in a stable state, and the situation in which the connector plug 310 has not come off from the connector adapter 320 occurs, and there is a problem that a worker may have an erroneous recognition.

The optical connector plug according to the present invention which solves the above problem is explained with reference to the drawings.

FIG. 5A through 5E are drawings explaining a connecting mechanism 500 of the optical connector plug according to the first embodiment of the present invention.

Figure 5A:
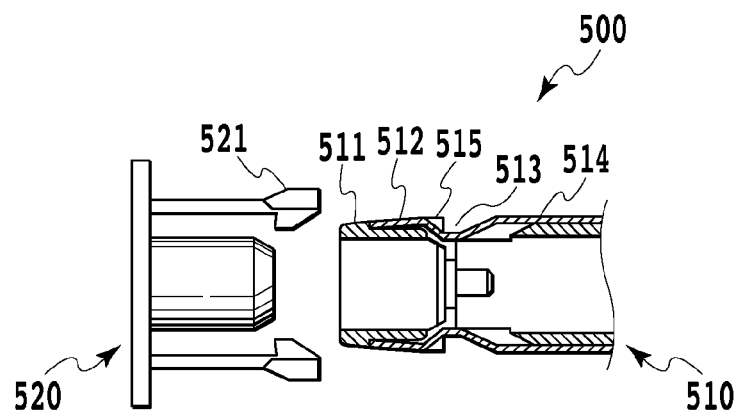
FIG. 5A is a drawing explaining a connecting mechanism of an optical connector plug according to a first embodiment of the present invention.
Figure 5B:
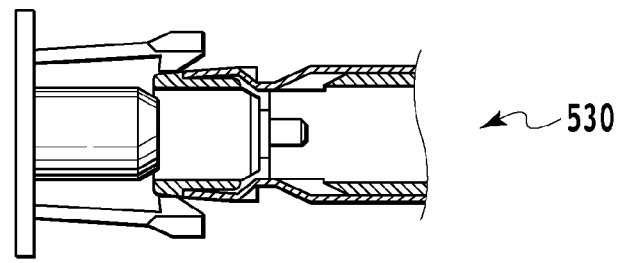
FIG. 5B is a drawing explaining the connecting mechanism of the optical connector plug according to the first embodiment of the present invention.
Figure 5C:
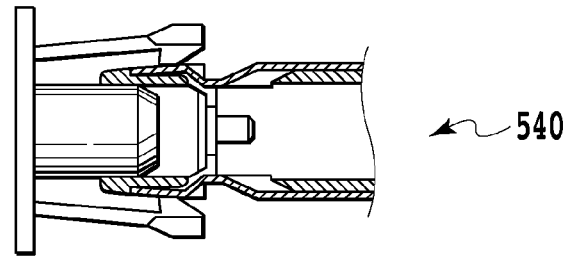
FIG. 5C is a drawing explaining the connecting mechanism of the optical connector plug according to the first embodiment of the present invention.

As shown in FIG. 5A through 5E, an optical connector plug 510 which has a locking releasing piece 514 in the position which adjoins a frame part extends a locking piece 521 of a connector adapter 520 by an approximately 10 tip taper part 511 as pushing in a plug (FIG. 5B).

Figure 5D:
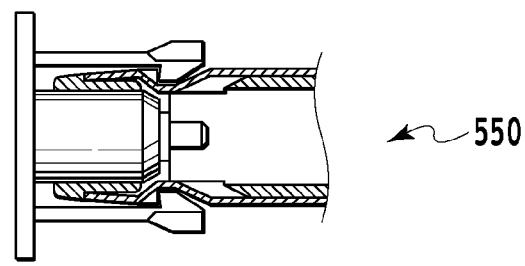
FIG. 5D is a drawing explaining the connecting mechanism of the optical connector plug according to the first embodiment of the present invention.

By pushing in, the locking piece 521 can extend gradually by an approximately 8° loose continuous central slope 512, and a rear flat part is moved (FIG. 5C), finally it falls in a step part 513, and the connector plug 510 and the connector adapter 520 connect in (FIG. 5D).

Figure 5E:
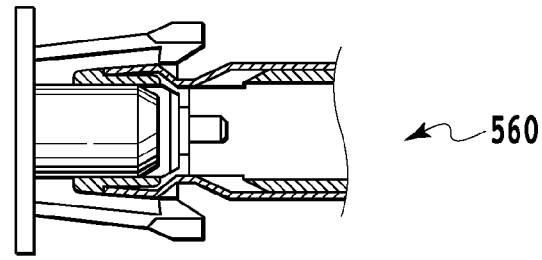
FIG. 5E is a drawing explaining the connecting mechanism of the optical connector plug according to the first embodiment of the present invention.

When releasing the connected plug 510 from the adapter 520, the plug 510 is retreated, while retreating the locking releasing piece 514 and releasing the locking piece 521 from the step part 513 (FIG. 5E).

Figure 6:
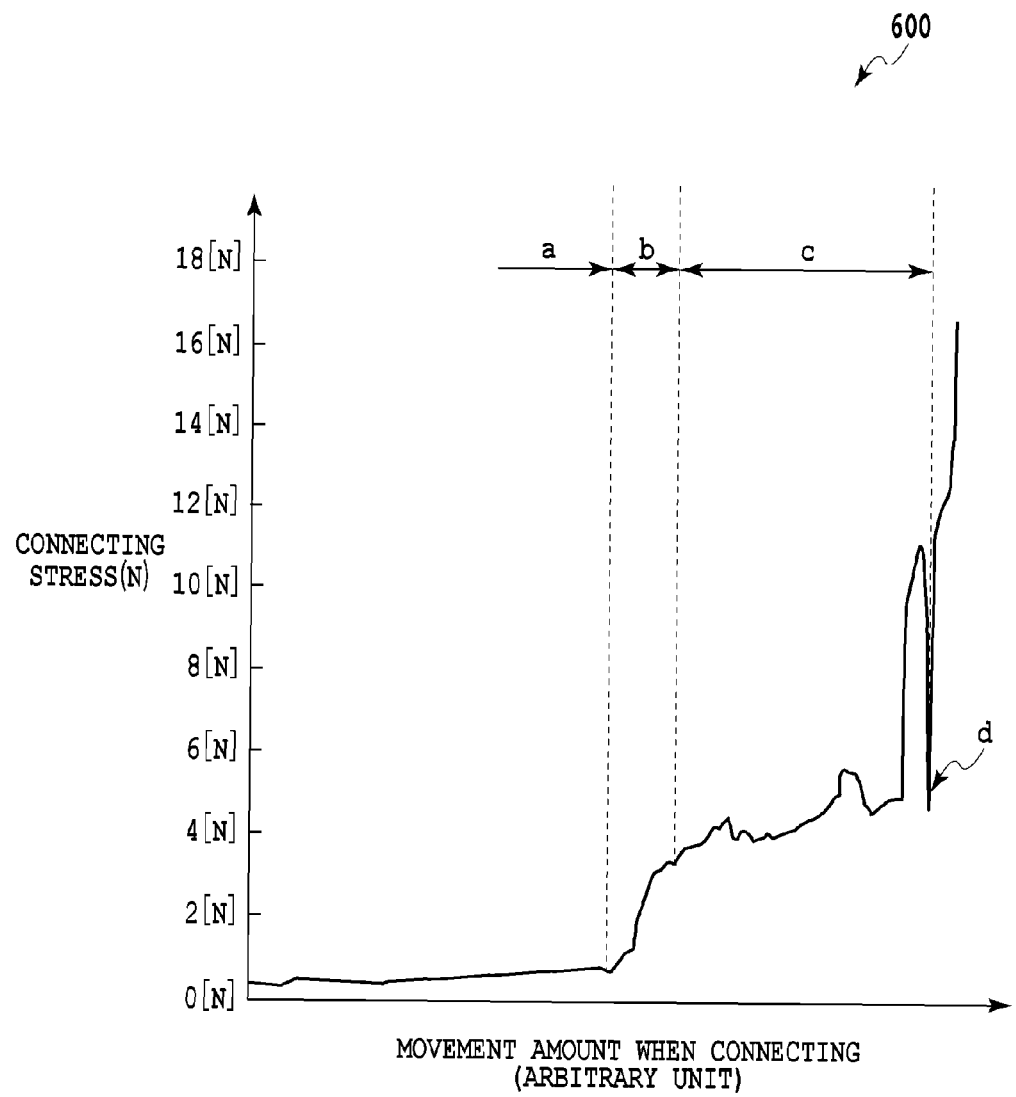
FIG. 6 is a drawing showing changes in stress when connecting the optical connector plug according to the first embodiment of the present invention.

FIG. 6 is a drawing showing changes in stress 600 when connecting the optical connector plug according to the first embodiment of the present invention.

The connector shown in FIG. 3A through FIG. 3D is extended along an approximately 33° slope at an internal tip of the plug frame. In contrast, the optical connector plug 510 according to the first embodiment of the present invention is extended along the approximately 10° slope 512. Thus, the stress when starting the connecting decreases from approximately 10 N to approximately 4 N. Furthermore, the connector shown in FIG. 3A through FIG. 3D moves on the flat frame on the way of insertion, and therefore, the stress drops down from the initial state of connecting although the stress does not become zero. In contrast, in the optical connector plug 510 according to the first embodiment of the present invention, since the taper part 511 at the tip portion of the plug frame is a gentle continuous slope, the elastic locking piece 521 is only gradually extended as the plug 510 is inserted into the adapter 520. Thus, the connecting stress hardly reduces from that in the initial state of connecting, but is increased again after the plug 510 contacts the ferrule on the other side, and the elastic locking piece 521 falls in the step part. Then, the stress decreases and connecting is completed.

From these results, the optical connector plug according to the present invention has a smaller stress in early stages of insertion and the connecting stress in the middle of insertion hardly reduces but increases gradually compared with the stress of connector shown in FIG. 3A through FIG. 3D. As a result, the state of the half-way insertion is still less likely to occur.

As shown in variations 700 and 710 for the slope shapes of the plug frame of FIG. 7A and FIG. 7B respectively, the width at a tip part of a taper part is almost equal to distances 705, 715 of the two locking pieces, and as for the slope, it is desirable that the inclination be as small as possible, and as continuous as possible so that the abrupt change in connecting stress does not occur.

Next, a second embodiment of the present invention is described with reference to FIG. 8.

The second embodiment is an embodiment provided with a light-shielding member disclosed in the patent literature 3. FIG. 8 is a drawing showing an outline of a connector 800 provided with a light-shielding member according to the second embodiment of the present invention.

Figure 8:
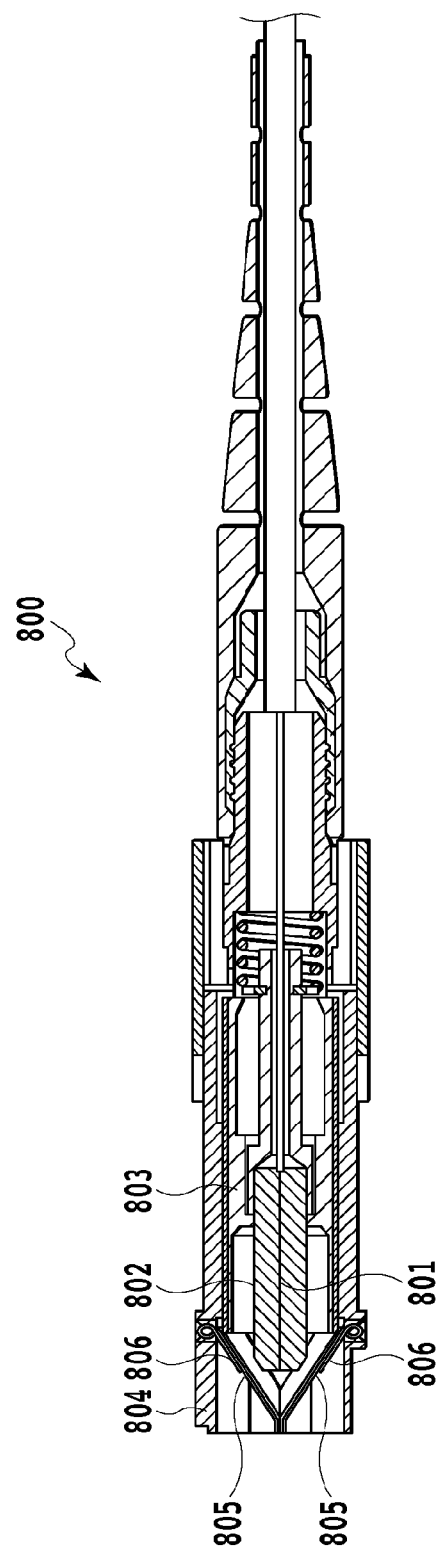
FIG. 8 is a drawing showing an outline of the optical connector plug with a light-shielding member according to a second embodiment of the present invention.

In FIG. 8, the light-shielding member is made up of a shutter housing 804 which surrounds an outside of a tubular plug frame 803 which stores therein and supports a ferrule 802 holding a tip part of an optical fiber 801, so as to make a freely slidable contact with the tubular plug frame 803, and which is inserted inside the opening part for connecting of a receptacle connector to be connected when connecting the optical connector; a shutter 805, one end part of which is supported by the housing at a front part of the shutter housing 804, the other end portion of which is energized by the elastic force from a spring 806 so as to shield the optical fiber 801 at the front portion of the ferrule 802 to be closed; and an elastic member (not shown), provided inside the shutter housing 804, always energizing the shutter housing 804 forwards, which is provided in a spacing between the rear part of the plug frame 803 and the shutter housing 804.

Moreover, according to the light-shielding member of the present embodiment, the shutter housing 804 surrounds the outside of the tubular plug frame 803 which stores therein and supports the ferrule 802 holding the tip part of the optical fiber 801, so as to make a freely slidable contact with the tubular plug frame 803, and is inserted inside the opening part for connecting of the receptacle connector. Therefore, the guide nature when mounting can be exhibited, and even if the light-shielding member is added on the side of the plug, there is no need of improvement in particular on the receptacle connector side of the other side of connecting, and it can be connected in the same manner as the conventional manner. Thus, the light-shielding member is highly versatile. Furthermore, the light-shielding member does not go outside the outside dimension of the plug housing of an optical plug connector, and therefore does not become an obstacle in a high density assembly.

The connecting mechanism of the optical connector plug described in the first embodiment of the present invention shown in FIG. 5A through 5E can be adopted also in the configuration provided with the light-shielding member shown in FIG. 8, and changes in stress when connecting the optical connector plug as shown in FIG. 6 can be reproduced.

According to the optical connector plug of the present invention, when connecting to the adapter, the adapter elastic locking piece is directly extended by the plug frame, to move the plug frame, and the adapter locking piece falls in the suspending part, thereby completing the connecting. With this mechanism, both the frame front part and frame center part of the plug form slopes, more preferably form slopes with constant inclination, whereby the stress increases gradually until the adapter locking piece falls in the suspending part of the plug frame, and it is possible to suppress a decrease in stress to the minimum.

As a result, the stress does not decrease in the middle when connecting the plug. Thus, the worker who connects the connector plug does not misunderstand that the plug is inserted in the suspending part, thereby preventing the half-way insertion.

Further, as the 7th clause of JIS C5973, structure, form, and size is defined in FIG. 1A through FIG. 1E, conventional SC connector has a slope angle of a front part of the plug frame of 25° to 35°. Here, the smaller is this slope angle, the smaller is the stress when connecting the flag frame to the adapter. In the optical connector plug of the present invention, however, since the taper part for extraction at a rear part of the plug housing of the conventional SC type connector is not needed, there is an advantage that the slope angle can be made smaller.

Although the length of the flat part parallel to the movement direction of the plug between the slope part in the frame center portion and the step part of the frame rear portion is defined such that the extended locking piece can be surely mounted to the flat portion in the generally used SC type connector. According to the optical connector plug of the present invention, the length can be shortened to the minimum. As a result, the slope angle can be made to a low angle, and changes in stress can be prevented from being generated.

REFERENCE SIGNS LIST

110 SC type connector plug by conventional technology
111 slope at tip of plug housing
112 flat part at tip part of plug housing
113 slope at rear part of plug housing
114 suspending part of plug frame
115, 313, 513 step part
120, 320, 520 adapter
121, 321, 521 elastic locking piece
310 connector plug of patent literature 1
311 front part of plug frame
312 flat part of plug frame
314, 514 pulling plate
510 connector plug of the present invention
511 tip taper part
512 central slope
515 rear flat part
705 elastic locking piece interval
801 optical fiber
802 ferrule
803 plug frame
804 shutter housing
805 shutter
806 spring

The invention claimed is:

1. An optical connector plug configured to be inserted into an adapter, the optical connector plug comprising:
a pair of engaging parts positioned on a tip part of a plug frame which is a body of said plug, each engaging part comprising a first taper part and a step part, and being configured to expand an elastic locking piece provided on a side of said adapter by the first taper part, and lock the elastic locking piece with the step part;
a locking releasing piece positioned between the pair of engaging parts and movable with respect to the pair of engaging parts along an insertion-extraction direction;
a second taper part positioned at a rear end of the locking releasing piece, the second taper part being configured to release a locking action of said elastic locking piece when extracting the plug; and
the first taper part of each engaging part having a slope, the angle of which decreases gently over the length of the first taper part as the first taper part extends toward the step part.

2. The optical connector plug according to claim 1, having a flat part between the taper part and the step part.

3. The optical connector plug according to claim 2, wherein the angle of the slope decreases from 10 to 8 degrees as the first taper part extends toward the step part.

4. The optical connector plug according to claim 1, wherein the angle of the slope decreases in a multistage fashion.

5. The optical connector plug according to claim 1, comprising a shutter housing provided outside said plug frame, wherein said shutter housing is provided with a light-shielding member.

6. The optical connector plug according to claim 1, wherein the angle of the slope decreases from 10 to 8 degrees as the first taper part extends toward the step part.

7. An optical connector plug configured to be inserted into an adapter, the optical connector plug comprising:
a pair of engaging parts positioned on a tip part of a plug frame which is a body of said plug, each engaging part comprising a first taper part and a step part, and being configured to expand an elastic locking piece provided on a side of said adapter by the first taper part, and lock the elastic locking piece with the step part;
a locking releasing piece positioned between the pair of engaging parts and movable with respect to the pair of engaging parts along an insertion-extraction direction;
a second taper part positioned at a rear end of the locking releasing piece, the second taper part being configured to release a locking action of said elastic locking piece when extracting the plug; and
the first taper part of each engaging part having a slope, the angle of which is constant over the length of the first taper part as the first taper part extends to the step part.

8. The optical connector plug according to claim 7, comprising a shutter housing provided outside said plug frame, wherein said shutter housing is provided with a light-shielding member.

9. An optical connector plug configured to be inserted longitudinally into an adapter having elastic locking pieces, the optical connector plug comprising:
a body having a plug frame positioned at a front portion thereof, the plug frame comprising first and second engaging parts each extending longitudinally from a front end of the plug frame to a back end, each engaging part comprising:
a first tapered portion positioned at the front end, the first tapered portion extending outward so as to expand one of the elastic locking pieces of the adapter outward as the optical connector plug is inserted into the adapter; and
a step portion extending rearward from the first tapered portion, the step portion being recessed inward from the first tapered portion so as to have a rearward facing ledge therebetween so that one of the elastic locking pieces of the adapter becomes locked in the step portion when the optical connector plug is inserted into the adapter, the first tapered portion having a slope that decreases as the first tapered portion extends rearward to the step portion; and a locking releasing piece adjoining the first and second engaging parts so as to be longitudinally movable with respect thereto, the locking releasing piece comprising a second tapered portion extending inward as the tapered portion extends rearward, the locking releasing piece being positioned such that as the locking releasing piece is moved longitudinally rearward, the second tapered portion enters the step portion so as to release the elastic locking pieces of the adapter from the step portion when the elastic locking pieces have been locked therein, so that the optical connector plug can be extracted from the adapter.

10. The optical connector plug according to claim 9, wherein the first tapered portion has a gentle continuous slope so that during insertion of the plug into the adapter, a connecting stress generally continuously rises until the elastic locking piece is locked within the step portion.

11. The optical connector plug according to claim 9, wherein the angle of the slope of the first tapered portion goes to zero at the step portion so that the first tapered portion has a flat section at the step portion.

12. The optical connector plug according to claim 9, wherein the angle of the slope of the first tapered portion decreases in a multi-tiered fashion.

13. The optical connector plug according to claim 9, further comprising a shutter housing in which the plug frame is housed, the shutter housing comprising a light-shielding member.

14. The optical connector plug according to claim 9, wherein the angle of the slope of the first tapered portion decreases from 10 to 8 degrees as the first tapered portion extends rearward.

15. An optical connector plug configured to be inserted longitudinally into an adapter having elastic locking pieces, the optical connector plug comprising:
a body having a plug frame positioned at a front portion thereof, the plug frame comprising first and second engaging parts each extending longitudinally from a front end of the plug frame to a back end, each engaging part comprising:
a first tapered portion positioned at the front end, the first tapered portion extending outward so as to expand one of the elastic locking pieces of the adapter outward as the optical connector plug is inserted into the adapter; and
a step portion extending rearward from the first tapered portion, the step portion being recessed inward from the first tapered portion so as to have a rearward facing ledge therebetween so that one of the elastic locking pieces of the adapter becomes locked in the step portion when the optical connector plug is inserted into the adapter, the first tapered portion having a slope whose angle remains constant as the first tapered portion extends rearward to the step portion; and
a locking releasing piece adjoining the first and second engaging parts so as to be longitudinally movable with respect thereto, the locking releasing piece comprising a second tapered portion extending inward as the tapered portion extends rearward, the locking releasing piece being positioned such that as the locking releasing piece is moved longitudinally rearward, the second tapered portion enters the step portion so as to release the elastic locking pieces of the adapter from the step portion when the elastic locking pieces have been locked therein, so that the optical connector plug can be extracted from the adapter.

16. The optical connector plug according to claim 15, wherein the first tapered portion has a gentle continuous slope so that during insertion of the plug into the adapter, a connecting stress generally continuously rises until the elastic locking piece is locked within the step portion.

17. The optical connector plug according to claim 15, further comprising a shutter housing in which the plug frame is housed, the shutter housing comprising a light-shielding member.

* * * * *